US007240433B2

(12) United States Patent
Chung et al.

(10) Patent No.: US 7,240,433 B2
(45) Date of Patent: Jul. 10, 2007

(54) METHOD OF FABRICATING A THERMAL INKJET HEAD HAVING A SYMMETRICAL HEATER

(75) Inventors: Chen-Kuei Chung, Hsinchu (TW); Chun-Jun Lin, Taichung (TW); Chung-Chu Chen, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 156 days.

(21) Appl. No.: 11/201,891

(22) Filed: Aug. 11, 2005

(65) Prior Publication Data

US 2005/0282089 A1 Dec. 22, 2005

Related U.S. Application Data

(62) Division of application No. 10/057,025, filed on Jan. 24, 2002, now Pat. No. 6,942,320.

(51) Int. Cl.
*B21D 53/76* (2006.01)
*B41J 2/05* (2006.01)
*G01D 15/00* (2006.01)

(52) U.S. Cl. .......................... 29/890.1; 29/831; 29/832; 29/835; 29/844; 29/845; 347/63; 216/27

(58) Field of Classification Search ............... 29/890.1, 29/830, 831, 832, 835, 844, 845; 347/63, 347/61, 54, 62, 65; 216/27; 430/320
See application file for complete search history.

(56) References Cited

U.S. PATENT DOCUMENTS 4,863,560 A * 9/1989 Hawkins ...................... 216/27
4,914,562 A 4/1990 Abe et al.
4,961,821 A * 10/1990 Drake et al. .................. 438/21
5,131,978 A * 7/1992 O'Neill .......................... 216/2
5,308,442 A 5/1994 Taub et al.
5,608,436 A * 3/1997 Baughman et al. ........... 347/65
6,155,674 A 12/2000 Figueredo et al.
6,214,245 B1 4/2001 Hawkins et al.
6,267,471 B1 7/2001 Ramaswami et al.

* cited by examiner

*Primary Examiner*—A. Dexter Tugbang
*Assistant Examiner*—Tai Van Nguyen
(74) *Attorney, Agent, or Firm*—Akin Gump Strauss Hauer & Feld LLP

(57) ABSTRACT

A method for fabricating a thermal inkjet head equipped with a symmetrical heater and the head fabricated by the method are provided. The method incorporates two thick photoresist deposition processes and a nickel electroplating process. The first thick photoresist deposition process is carried out to form an ink chamber in fluid communication with a funnel-shaped manifold and an injector orifice. The second thick photoresist deposition process forms a mold for forming an injector passageway that leads to the injector orifice. The nickel electroplating process provides an orifice plate on top of the inkjet head through which an injector passageway that leads to the injector orifice is provided for injecting ink droplets.

10 Claims, 3 Drawing Sheets

METHOD OF FABRICATING A THERMAL INKJET HEAD HAVING A SYMMETRICAL HEATER

CROSS-REFERENCE TO RELATED APPLICATIONS

This application is a divisional of U.S. application Ser. No. 10/057,025 filed Jan. 24, 2002, now U.S. Pat. No. 6,942,320 the entire disclosure of which is incorporated herein by reference.

BACKGROUND OF THE INVENTION

1. Field of the Invention

The present invention generally relates to an integrated micro-droplet generator and more particularly, relates to a thermal bubble type inkjet head that is equipped with a symmetrical, off-shooter heater and a method for fabricating the head.

2. Background

Since the advent of printers, and specifically for low cost printers for personal computers, a variety of inkjet printing mechanisms have been developed and utilized in the industry. These inkjet printing mechanisms include the piezoelectric type, the electrostatic type and the thermal bubble type, etc. After the first thermal inkjet printer becomes commercially available in the early 1980's, there has been a great progress in the development of inkjet printing technology.

In an inkjet printer, a liquid droplet injector is used as one of the key mechanisms. To provide a high-quality and reliable inkjet printer, the availability of a liquid droplet injector capable of supplying high-quality droplets at high-frequency and high-spacial resolution is critical.

Presently, there are two types of inkjet printers that are available in the market, the piezoelectric type and the thermal type. The thermal inkjet system, also known as thermal bubble inkjet system, thermally driven bubble system or as bubble jet system utilizes bubble to eject ink droplets out of an ink supply chamber, while piezoelectric printers utilize piezoelectric actuators to pump ink out from a reservoir chamber. The principle of operation for a thermal bubble inkjet system is that an electrical current is first used to heat an electrode to boil liquid in an ink reservoir chamber. When the liquid is in a boiling state, bubble forms in the liquid and expands and thus functioning as a pump to eject a fixed quantity of liquid from the reservoir chamber through an orifice and then forms into droplets. When the electrical current is turned-off, the bubble generated collapses and liquid refills the chamber by capillary force.

When evaluating the performance of a thermal bubble inkjet system, factors such as droplet ejection frequency, cross talk between adjacent chambers and the generation of satellite droplets are considered. Two of these performance requirements, i.e. the satellite droplets, which degrade the sharpness of the image produced and the cross talk between adjacent chambers and flow channels which decrease the quality and reliability of the inkjet system are frequently encountered. In order to improve the performance of a thermal bubble inkjet system, these drawbacks must be corrected.

It is therefore an object of the present invention to provide a thermal bubble inkjet head that does not have the drawbacks or the shortcomings of the conventional thermal bubble inkjet head.

It is another object of the present invention to provide a thermal bubble inkjet head that is equipped with a symmetrical ring-shaped heater for generating bubbles.

It is another further object of the present invention to provide a thermal bubble inkjet head that is equipped with an ink chamber.

It is yet another object of the present invention to provide a method for fabricating a thermal bubble inkjet head that is equipped with a symmetrical heater.

It is still another further object of the present invention to provide a method for fabricating a thermal bubble inkjet head that is equipped with a symmetrical heater by utilizing two separate thick photoresist deposition processes and a nickel electroplating process.

BRIEF SUMMARY OF THE INVENTION

In accordance with the present invention, a thermal bubble inkjet head that is equipped with a symmetrical heater and a method for fabricating such head are disclosed.

In a preferred embodiment, a method for fabricating a thermal bubble inkjet head that is equipped with off-shooter heaters is provided which includes the operating steps of providing a silicon substrate that has a top surface and a bottom surface; forming a first and a second insulating material layer of at least 1000 Å thick on the top and bottom surfaces; reactive ion etching an opening for a manifold in the second insulating material layer on the bottom surface; wet etching a funnel-shaped manifold in the silicon substrate; forming a symmetrical ring-shaped heater on the first insulating material layer on the top surface; depositing and patterning an interconnect with a conductive metal in electrical communication with the ring-shaped heater; depositing a third insulating material layer on top of the ring-shaped heater and the first insulating material layer; spin-coating a first photoresist layer of at least 2000 Å thick on top of the third insulating material layer; patterning by UV exposure an ink chamber in fluid communication with said manifold; depositing a metal seed layer on the first photoresist layer and patterning an inkjet orifice in the metal seed layer; spin-coating a second photoresist layer of at least 2000 Å thick on the metal seed layer and patterning the inkjet orifice; removing the developed second photoresist layer except on top of the inkjet orifice; electroplating nickel on top of the metal seed layer encapsulating the second photoresist layer on top of the inkjet orifice; stripping away the second photoresist layer on top of the inkjet orifice; reactive ion etching away the second insulating material layer on the bottom surface of the silicon substrate and the first insulating material layer exposed in the manifold; and stripping away the first photoresist layer from the ink chamber.

The method for fabricating a thermal bubble inkjet head may further include the step of forming the first and second insulating material layers with either $SiO_2$ or $Si_3N_4$, or the step of wet etching a funnel-shaped manifold in the silicon substrate by KOH, or the step of forming the ring-shaped heater with TaAl, or the step of depositing the third insulating material layer of $Si_3N_4$ or SiC. The method may further include the step of spin-coating a first photoresist layer preferably of at least 5000 Å thick, or the step of depositing the metal seed layer of Cr and Ni, or the step of stripping away the second photoresist layer by a wet etching method, or the step of stripping away the first photoresist layer from the ink chamber by a wet etching technique, or the step of patterning the inkjet orifice in the metal seed layer adjacent to said ring-shaped heater.

The present invention is further directed to a thermal bubble inkjet head that is equipped with symmetrical heaters which includes a silicon substrate that has a top surface and a bottom surface; a first and a second insulating material layer of at least 1000 Å thick on the top and bottom surfaces; a funnel-shaped manifold formed in the second insulating material layer and the silicon substrate; a symmetrical ring-shaped heater formed on the first insulating material layer on the top surface; an interconnect formed of a conductive metal in electrical communication with the ring-shaped heater; a third insulating material layer on top of the ring-shaped heater and the first insulating material layer; a first photoresist layer of at least 2000 Å thick on top of the third insulating material layer; an ink chamber formed in the first photoresist layer in fluid communication with the funnel-shaped manifold; a metal seed layer on top of the first photoresist layer and an inkjet orifice formed in the metal seed layer; and a Ni layer on top of the metal seed layer with an aperture formed therein in fluid communication with the inkjet orifice.

In the thermal bubble inkjet head that is equipped with a symmetrical heater, the first photorcsist layer preferably has a thickness of at least 5000 Å, the inkjet orifice is formed in close proximity to the ring-shaped heater; the first and second insulating material layers may be a $SiO_2$ layer or a $Si_3N_4$ layer. The ring-shaped heater may be formed of TaAl, the metal seed layer may be deposited of Cr or Ni. The ring-shaped heater may be positioned in the ink chamber. The inkjet orifice may be formed in the ink chamber opposite to the ring-shaped heater. The inkjet head may be a monolithic head.

BRIEF DESCRIPTION OF THE DRAWINGS

These and other objects, features and advantages of the present invention will become apparent from the following detailed description and the appended drawings in which:

FIG. 1H is an enlarged, cross-sectional view of the present invention silicon substrate of FIG. 1H with a second thick photoresist layer spin-coated on top and patterned.

DETAILED DESCRIPTION OF THE PREFERRED AND ALTERNATE EMBODIMENTS

The present invention discloses a thermal bubble inkjet head that is equipped with a symmetrical heater. The present invention further discloses a method for fabricating such a thermal bubble inkjet head.

In the present invention method, two separate thick photoresist deposition processes by spin-coating and a nickel electroplating process are required for achieving the final structure. The first thick photoresist spin-coating process is used for forming an ink chamber. The second thick photoresist spin-coating process is used to form a mold layer for forming an inkjet orifice. The nickel electroplating process is used to form a top plate on the inkjet head through which the injector orifice is formed. None of these novel processing steps is used in conventional inkjet head formation methods.

The present invention thermal bubble inkjet head has a construction of the monolithic type formed on a silicon single crystal substrate. A ring-shaped heater electrode is formed in a symmetrical manner for superior liquid droplet generation. The ring-shaped heater electrode is further formed with a high directional perpendicularity. With the present invention symmetrically constructed ring-shaped heater electrode, the conventional problems of satellite droplets and interferences between adjacent orifices and flow channels can be minimized. The benefits and advantages described above are achieved by the present invention symmetrically arranged heater electrode is formed either in an off-shooter arrangement or in a back-shooter arrangement. An off-shooter arrangement process flow is described below, while the process flow for a back-shooter arrangement can be similarly executed with minor modifications. The term “off-shooter” means the position of the heater off-shifted the position of the nozzle from the normal direction.

Figure 1A:
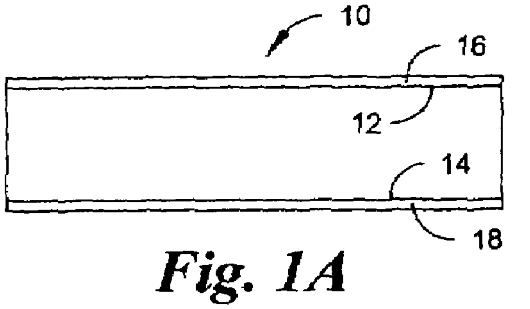
FIG. 1A is an enlarged, cross-sectional view of a present invention silicon substrate coated with an insulating material layer on a top surface and a bottom surface.

Referring initially to FIG. 1A, wherein a silicon substrate 10 used for constructing the present invention inkjet head is shown. On a top surface 12 of the silicon substrate, and on a bottom surface 14 of the same, are then deposited by a low pressure chemical vapor deposition method insulating material layers 16 and 18, respectively. The insulating material layers 16,18 can be formed of either $SiO_2$ or $Si_3N_4$ to a thickness between about 1000 Å, and preferably to about 2000 Å. In the preferred embodiment, a P-type 101 mm diameter silicon wafer that has a crystal orientation of (100) is utilized. A RCA cleaning procedure is first used to clean the wafer prior to processing. The $SiO_2$ layer may also be formed by a wet oxidation method in a furnace tube to a thickness larger than 1 μm.

Figure 1B:
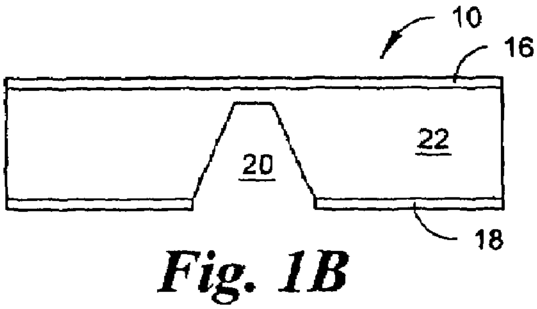
FIG. 1B is an enlarged, cross-sectional view of the present invention silicon substrate of FIG. 1A with an opening dry etched in the bottom insulating layer and a funnel-shaped manifold wet etched in the silicon substrate.

A first mask is then used, as shown in FIG. 1B, in a photolithographic process to define the position of manifold 20 and forming the manifold 20 by first dry etching the $SiO_2$ layer 18 by a reactive ion etching technique, and then etching the silicon layer 22 by a wet etching utilizing KOH solution. The process is completed by rinsing the wafer with DI (deionized) water.

Figure 1C:
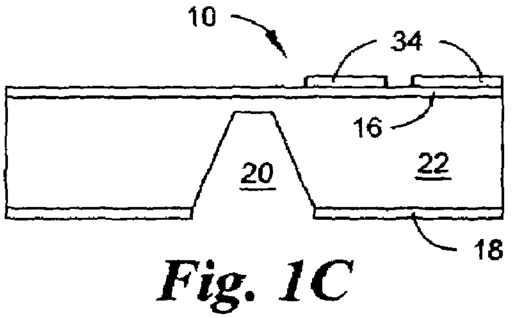
FIG. 1C is an enlarged, cross-sectional view of the present invention silicon substrate of FIG. 1B with a metal layer deposited on top and then formed into an interconnect.

In the next step of the process, shown in FIG. 1C, a second mask is first used in a photolithographic process to define the locations of an interconnect 34. A metal layer such as Al or Cu is first evaporated on top of the insulating material layer 16 and patterned into the interconnect 34. The process is again completed with a DI water rinsing of the silicon wafers.

Figure 1D:
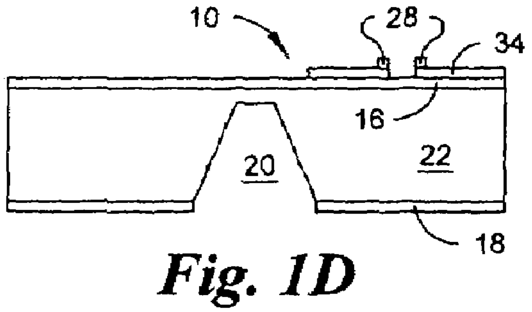
FIG. 1D is an enlarged, cross-sectional view of the present invention silicon substrate of FIG. 1C with a heater connected to an interconnect.
Figure 1E:
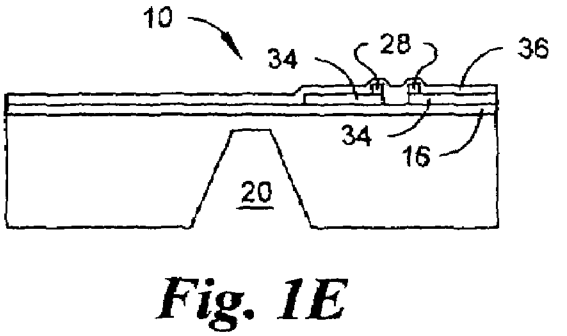
FIG. 1E is an enlarged, cross-sectional view of the present invention silicon substrate of FIG. 1D with a passivation layer deposited on top of the substrate.

A symmetrical ring-shaped heater electrode 28 is then formed on top of the interconnect 34 by first depositing a metal layer such as TaAl alloy and then photolithographically patterning the metal layer. A third photomask is used for the heater electrode forming process shown in FIG. 1D. Following the heater electrode forming process, shown in FIG. 1E, an insulating material layer, or a passivation layer 36, is deposited on top of the silicon substrate 10 to provide insulation to the various structures of the interconnection 34 and the heater electrode 28. The passivation layer 36 is a protection layer which can be deposited of a material selected from $Si_3N_4$, SiC and $SiO_2$ by a plasma enhanced chemical vapor deposition technique. This is shown in FIG. 1E.

Figure 1F:
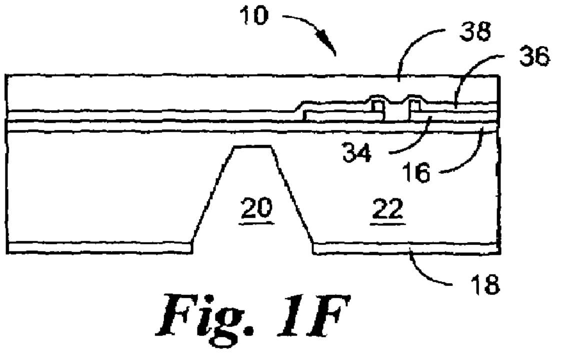
FIG. 1F is an enlarged, cross-sectional view of the present invention silicon substrate of FIG. 1E with a thick photoresist layer deposited on top.
Figure 1G:
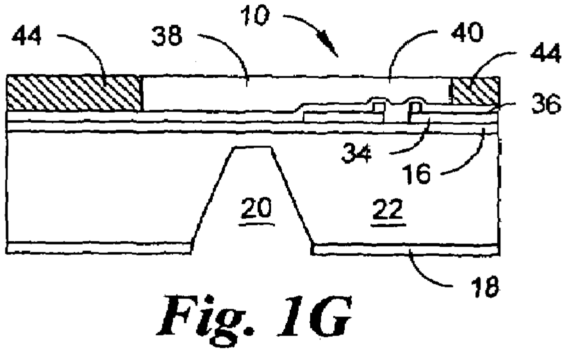
FIG. 1G is an enlarged, cross-sectional view of the present invention silicon substrate of FIG. 1F with a pattern formed in the photoresist layer by UV exposure.

The present invention novel method continues by the advantageous deposition step, shown in FIG. 1F, of a first thick photoresist layer 38 on top of the silicon substrate 10. The photoresist layer 38 should have a thickness of at least 20 μm, and preferably 25–35 μm deposited by a spin-coating technique and then baked for drying. An exposure process utilizing UV radiation, shown in FIG. 1G, follows by using a fourth photomask to define the size and location of the ink chamber 40. A developing step is not executed at this stage such that all the photoresist layers 38, either the exposed portion 44 or the unexposed portion 38, stays on top of the silicon substrate 10. This is a critical step of the present invention and must be patterned with great accuracy such that the positions of the ink chamber 40 can be determined.

Figure 1H:
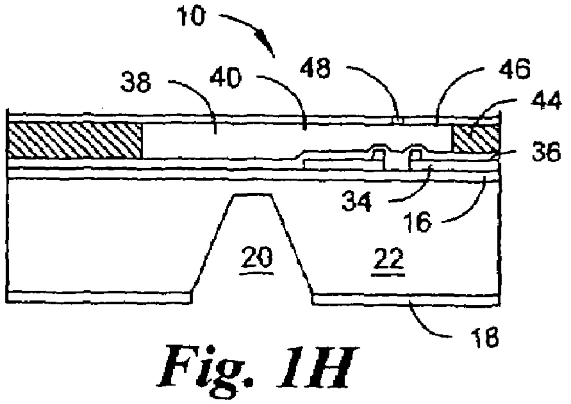
FIG. 1H is an enlarged, cross-sectional view of the present invention silicon substrate of FIG. 1G with a metal seed layer deposited and patterned for the inkjet orifice on top.

In the next step of the process, shown in FIG. 1H, a metal seed layer 46 is deposited on top of the photoresist layer 38,44 and patterned to define an ejection orifice 48 in the metal seed layer. The metal seed layer may be deposited of a Cr/Ni alloy by sputtering or evaporation and used as a seed layer for a subsequent electroplating process. A fifth photomask is used in a photolithography process to define the size and location of the ejection orifice 48. The ejection orifice 48 is formed by a wet etching technique followed by a process for removing the photoresist layer used in the lithography process.

Figure 1I:
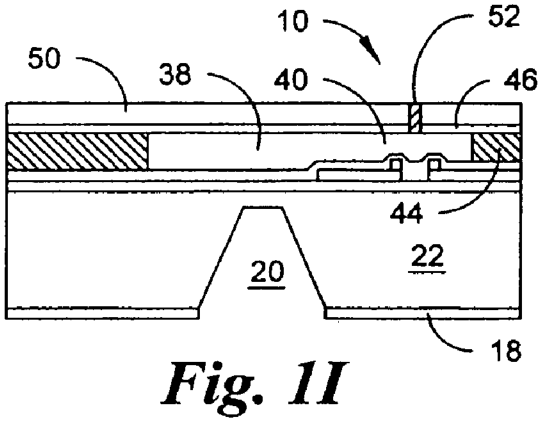
FIG. 1J is an enlarged, cross-sectional view of the present invention silicon substrate of FIG. 1I with the second photoresist layer developed.
FIG. 1K is an enlarged, cross-sectional view of the present invention silicon substrate of FIG. 1J with an orifice plate electroplated on top.
FIG. 1L is an enlarged, cross-sectional view of the present invention silicon substrate of FIG. 1K with the remaining second photoresist layer stripped to form the orifice.
FIG. 1M is an enlarged, cross-sectional view of the present invention silicon substrate of FIG. 1L with the bottom insulating layer and the top insulating layer and the passivation layer stripped by dry etching.
FIG. 1N is an enlarged, cross-sectional view of the present invention silicon substrate of FIG. 1M with the first photoresist layer stripped to form the ink chamber.

The present invention novel method is followed, as shown in FIG. 1I, by a second thick photoresist layer 50 deposition process. The deposition can be carried out by a spin-coating technique and then the photoresist layer 50 is patterned for the ink passageway 72. The process is then followed by a photoresist developing process, during which the photoresist layer 50 is removed except at the ink passageway 72, which stays on top of the ejection orifice 48. This is shown in FIG. 1J.

Figure 1M:
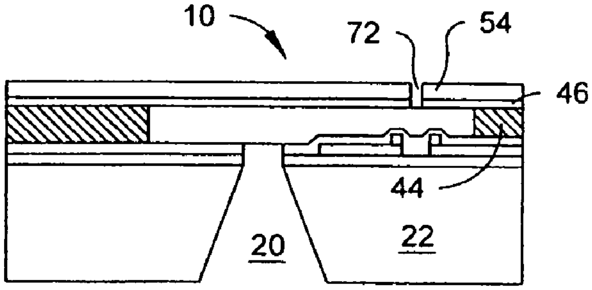
Figure 1J:
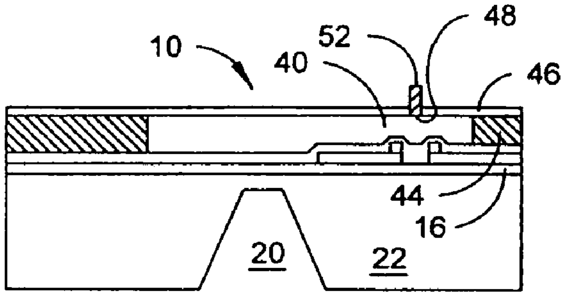
Figure 1N:
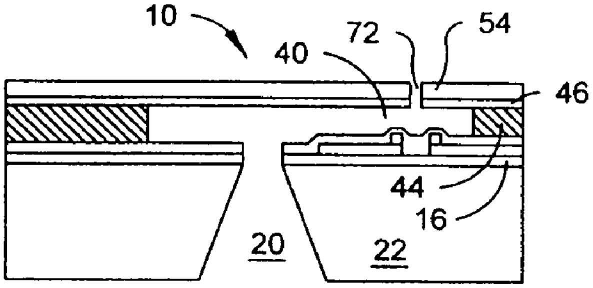
Figure 1K:
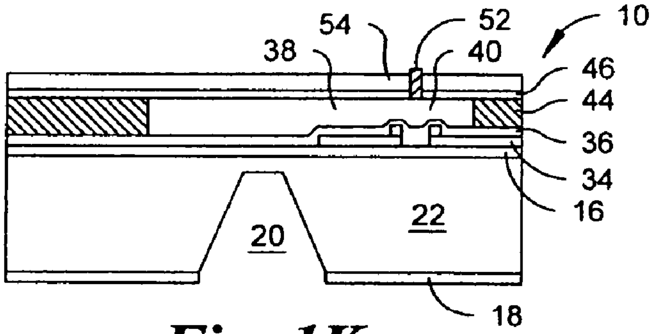
Figure 1L:
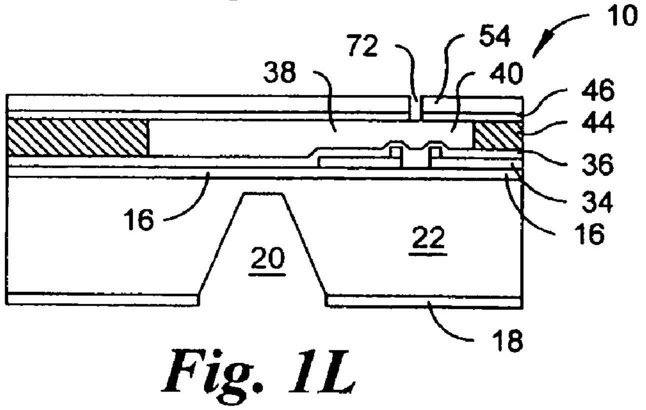

An orifice plate 54 is then formed by a nickel electroplating process, as shown in FIG. 1K. The residual, second thick photoresist layer 50 in the ink passageway 72 is then removed to form the injection passage in fluid communication with the ink chamber 40, as shown in FIG. 1L. The photoresist removal process is performed by a wet etching technique.

The backside of the silicon substrate 10 is then etched by a reactive ion etching technique to remove the bottom insulating material layer 18, as shown in FIG. 1M, and the top insulating material layer 16 exposed in the manifold 20.

In the final step of the process, as shown in FIG. 1N, the first thick photoresist layer 38 is removed by a developing solution to vacate the ink chamber 40 in fluid communication with the manifold 20 and the ink passageway 72. The present invention novel thermal bubble inkjet head that is equipped with symmetrical heaters is thus completed.

Figure 2A:
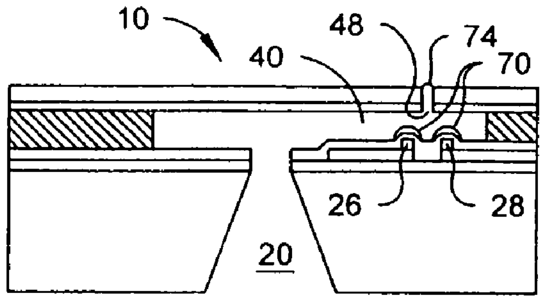
FIG. 2A is an enlarged, cross-sectional view of the present invention inkjet head illustrating its first operating step wherein a ring-shaped bubble is generated by the ring-shaped heater.

The operation of the present invention thermal bubble inkjet head having an off-shooter arrangement is shown in FIGS. 2A.–.2E. At the beginning of the process, the funnel-shaped manifold 20 and the ink chamber 40 are filled with an ink material. The ring-shaped heater electrode 28 is then heated to produce a ring-shaped bubble 70. As a result, a small ink column 74 is pushed out of the ink passageway 72 through the orifice 48. The bubble 70 enlarges, as shown in FIGS. 2B and 2C, to further push the ink column 74 out of the ink passageway 72, as the heater electrode 28 continuously heats the ink contained in the ink chamber 40.

Figure 2E:
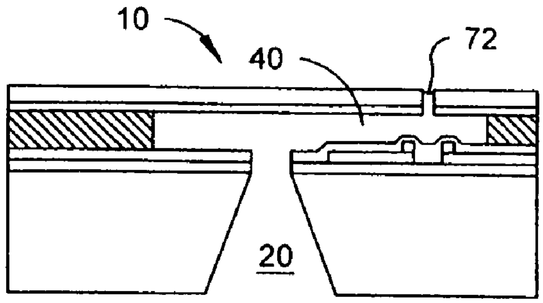
FIG. 2E is an enlarged, cross-sectional view of the present invention inkjet head illustrating the circular bubble is collapsed.
Figure 2B:
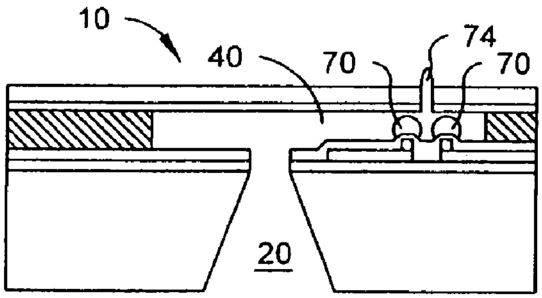
FIG. 2B is an enlarged, cross-sectional view of the present invention inkjet head illustrating the second step of operation wherein the ring-shaped bubble is enlarged to push out an ink column.
Figure 2C:
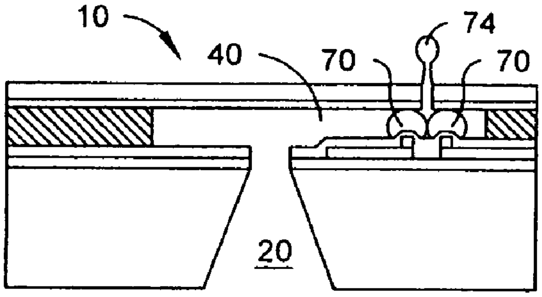
FIG. 2C is an enlarged, cross-sectional view of the present invention inkjet head illustrating the third operating step in which the bubble is further enlarged to push out the ink column.
Figure 2D:
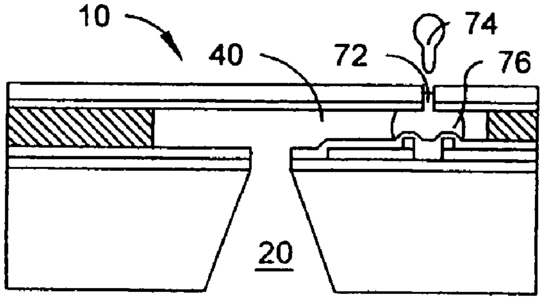
FIG. 2D is an enlarged, cross-sectional view of the present invention inkjet head illustrating the fourth operating step in which a circular bubble is generated to dislodge the ink column.

Finally, as shown in FIGS. 2D and 2E, the ring-shaped bubble 70 forms a circular bubble 76 and thus, cutting off the ink droplet 74 completely from the ink contained in the ink chamber 40. As a result, the ink droplet 74 separates from the inkjet passageway 72 and forms an ink droplet toward the target. After the inkjet droplet 74 departs from the inkjet head 10, the bubble 76 collapses forming a void (not shown).

Figure 3:
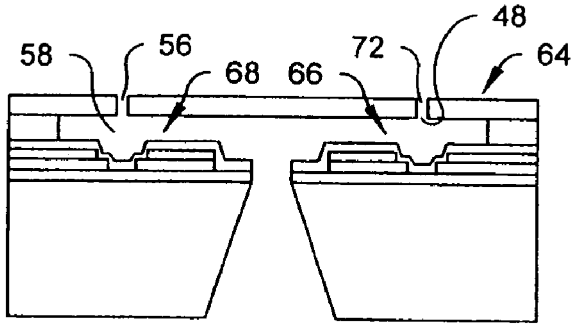
FIG. 3 is a third embodiment of the present invention thermal bubble inkjet head equipped with two inkjet orifices for two symmetrial, off-shooter heaters.

In a third preferred embodiment of the present invention, shown in FIG. 3, a present invention thermal bubble inkjet head 64 is provided which has a different construction of the heater electrodes 66 and 68.

The present invention novel thermal bubble inkjet head equipped with symmetrical heaters and a method for fabricating the head have therefore been amply described in the above description and in the appended drawings of FIGS. 1A–3E.

While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the inventions.

The embodiment of the invention in which an exclusive property or privilege is claimed are defined as follows.

What is claimed is:

1. A method for fabricating a thermal bubble inkjet head equipped with a symmetrical off-shooter heater comprising:

providing a silicon substrate having a top surface and a bottom surface;

forming a first and a second insulating material layer of at least 1000 Å thick on said top and bottom surfaces;

reactive ion etching an opening for a manifold in said second insulating material layer on said bottom surface;

wet etching a funnel-shaped manifold in said silicon substrate;

forming a symmetrical ring-shaped heater on said first insulating material layer on said top surface;

depositing and patterning an interconnect with a conductive metal in electrical communication with said ring-shaped heater;

depositing a third insulating material layer on top of said ring-shaped heater and said first insulating material layer;

spin-coating a first photoresist layer of at least 2000 Å thick on top of said third insulating material layer;

patterning by UV exposure an ink chamber in said first photoresist layer;

depositing a metal seed layer on said first photoresist layer and patterning an inkjet orifice in said metal seed layer;

spin-coating a second photoresist layer of at least 2000 Å thick on said metal seed layer and patterning said inkjet orifice;

removing said developed second photoresist layer except on top of said inkjet orifice;

electroplating Ni on top of said metal seed layer encapsulating said second photoresist layer on top of said inkjet orifice;

stripping away said second photoresist layer on top of said inkjet orifice;

reactive ion etching away said second insulating material layer on said bottom surface of the silicon substrate and said first insulating material layer exposed in said manifold; and stripping away said first photoresist layer from said ink chamber.

2. A method for fabricating a thermal bubble inkjet head equipped with a symmetrical heater according to claim 1 further comprising:

forming said first and second insulating material layers by either $SiO_2$ or $Si_3N_4$.

3. A method for fabricating a thermal bubble inkjet head equipped with a symmetrical heater according to claim 1 further comprising:

wet etching a funnel-shaped manifold in said silicon substrate by KOH.

4. A method for fabricating a thermal bubble inkjet head equipped with a symmetrical heater according to claim 1 further comprising:

forming said symmetrical ring-shaped heater with TaAl.

5. A method for fabricating a thermal bubble inkjet head equipped with a symmetrical heater according to claim 1 further comprising:

depositing said third insulating material layer of $Si_3N_4$ or SiC.

6. A method for fabricating a thermal bubble inkjet head equipped with a symmetrical heater according to claim 1 further comprising:

spin-coating a first photoresist layer preferably of at least 5000 Å thick.

7. A method for fabricating a thermal bubble inkjet head equipped with a symmetrical heater according to claim 1 further comprising:

depositing said metal seed layer of Cr and Ni.

8. A method for fabricating a thermal bubble inkjet head equipped with a symmetrical heater according to claim 1 further comprising:

stripping away said second photoresist layer by a wet etching method.

9. A method for fabricating a thermal bubble inkjet head equipped with a symmetrical heater according to claim 1 further comprising:

stripping away said first photoresist layer from said chamber by a wet etching technique.

10. A method for fabricating a thermal bubble inkjet head equipped with a symmetrical heater according to claim 1 further comprising:

patterning said inkjet orifice in said metal seed layer adjacent to said ring-shaped heater.

* * * * *